(12) United States Patent
Hockett et al.

(10) Patent No.: US 9,359,151 B2
(45) Date of Patent: Jun. 7, 2016

(54) FLUID-BASED ARTICLE DISTRIBUTION AND SORTING SYSTEM

(71) Applicant: ConAgra Foods Lamb Weston, Inc., Omaha, NE (US)

(72) Inventors: William Thomas Hockett, Kennewick, WA (US); Frederick D. Webb, Hermiston, OR (US); Michael Christopher Metcalf, Kennewick, WA (US); Ronald R. Huff, Kennewick, WA (US); Charles Denio Kirkbride, Richland, WA (US); Greg Robert Lambier, Kennewick, WA (US); Dave Hufford, Walla Walla, WA (US)

(73) Assignee: ConAgra Foods Lamb Weston, Inc., Omaha, NE (US)

( * ) Notice: Subject to any disclaimer, the term of this patent is extended or adjusted under 35 U.S.C. 154(b) by 0 days.

(21) Appl. No.: 14/340,874

(22) Filed: Jul. 25, 2014

(65) Prior Publication Data

US 2015/0016898 A1    Jan. 15, 2015

Related U.S. Application Data

(63) Continuation of application No. 12/986,860, filed on Jan. 7, 2011, now Pat. No. 8,821,078.

(51) Int. Cl.
*B65G 53/28* (2006.01)
*B65G 51/02* (2006.01)
(Continued)

(52) U.S. Cl.
CPC .............. *B65G 51/02* (2013.01); *B65G 47/684* (2013.01); *B65G 47/72* (2013.01); *B65G 51/01* (2013.01); *A23N 2015/008* (2013.01); *B65B 2039/009* (2013.01); *B65G 2201/0211* (2013.01);
(Continued)

(58) Field of Classification Search
USPC .......................................... 406/106, 155, 181
See application file for complete search history.

(56) References Cited

U.S. PATENT DOCUMENTS 2,703,687 A * 3/1955 Prietzel .................. B65G 51/24
                                                    104/130.01
3,189,230 A * 6/1965 Gillespie ................ A01C 7/081
                                                    111/73
(Continued)

FOREIGN PATENT DOCUMENTS

DE       202004007322     11/2004
EP          1342400        9/2003
(Continued)

OTHER PUBLICATIONS

Russian Office Action dated Oct. 15, 2015 with English Translation.
(Continued)

*Primary Examiner* — Joseph Dillon, Jr.
(74) *Attorney, Agent, or Firm* — Ryan T. Grace; Advent, LLP

(57) ABSTRACT

A fluid-based radial distribution system includes an internal passageway and a plurality of openings radially spaced around the internal passageway. A plurality of gate members are associated with at least some of the plurality of openings, with the gate members are configured to move between an open position that allows product to move through the opening associated with that gate member and a closed position that restricts product from moving through the opening associated with that gate member.

5 Claims, 7 Drawing Sheets

(51) Int. Cl.
B65G 47/68 (2006.01)
B65G 47/72 (2006.01)
B65G 51/01 (2006.01)
B65B 39/00 (2006.01)
A23N 15/00 (2006.01)

(52) U.S. Cl.
CPC .... *Y10T137/0318* (2015.04); *Y10T 137/85938* (2015.04); *Y10T 137/877* (2015.04)

(56) References Cited

U.S. PATENT DOCUMENTS

| | | | |
|---|---|---|---|
| 3,267,891 A * | 8/1966 | Hemker | F23K 3/00 110/104 R |
| 3,272,561 A * | 9/1966 | Farnsworth | B65G 47/72 406/181 |
| 3,592,336 A | 7/1971 | Thurston et al. | |
| 3,643,689 A | 2/1972 | Isreeli et al. | |
| 3,652,131 A | 3/1972 | Carlsson | |
| 3,754,638 A | 8/1973 | Mead | |
| 3,827,578 A * | 8/1974 | Hough | B65G 47/72 141/67 |
| 3,918,116 A * | 11/1975 | Valdespino | A23N 12/02 15/3.13 |
| 4,024,822 A | 5/1977 | Ross et al. | |
| 4,211,609 A | 7/1980 | Diggs | |
| 4,264,242 A | 4/1981 | Lecomte | |
| 4,305,822 A | 12/1981 | Eimer et al. | |
| 4,311,591 A | 1/1982 | Eimer et al. | |
| 4,398,612 A | 8/1983 | Mikami et al. | |
| 4,463,583 A | 8/1984 | Kruger et al. | |
| 4,562,968 A | 1/1986 | Widmer et al. | |
| 4,569,405 A | 2/1986 | Oshima | |
| 4,570,831 A | 2/1986 | Izumi at al. | |
| 4,596,327 A | 6/1986 | Yamano | |
| 4,819,875 A | 4/1989 | Beal | |
| 4,941,565 A | 7/1990 | Hiroto et al. | |
| 4,966,273 A | 10/1990 | Sashiki | |
| 5,176,177 A | 1/1993 | Rupp | |
| 5,207,310 A | 5/1993 | Maddocks | |
| 5,804,772 A | 9/1998 | Wooldridge at al. | |
| 5,855,269 A | 1/1999 | Flinton | |
| 5,918,809 A | 7/1999 | Simmons | |
| 6,023,050 A | 2/2000 | Violi | |
| 6,290,433 B2 | 9/2001 | Poncelet et al. | |
| 6,360,870 B1 | 3/2002 | Wooldridge | |
| 6,851,450 B2 | 2/2005 | Nimberger | |
| 7,063,215 B2 | 6/2006 | Baranowski | |
| 7,264,423 B2 | 9/2007 | Kowalchuk | |
| 9,216,864 B1 * | 12/2015 | Plessius | B65G 51/01 |
| 2004/0140106 A1 | 7/2004 | De Anda-Uribe et al. | |
| 2004/0148056 A1 * | 7/2004 | Baranowski | B65B 37/04 700/240 |
| 2005/0042043 A1 | 2/2005 | Levy et al. | |
| 2008/0017558 A1 | 1/2008 | Pollock et al. | |
| 2011/0005896 A1 * | 1/2011 | Kirkbride | B65G 47/72 198/359 |
| 2011/0072970 A1 | 3/2011 | Slobodzian et al. | |
| 2011/0240755 A1 | 10/2011 | Petrovich | |
| 2013/0195138 A1 | 8/2013 | Monti | |

FOREIGN PATENT DOCUMENTS

| | | |
|---|---|---|
| EP | 1478221 | 11/2004 |
| EP | 1478221 | 1/2007 |
| EP | 1478221 | 10/2007 |
| JP | 59053308 | 3/1984 |
| JP | 1987-269817 | 11/1987 |
| JP | 2001171826 | 6/2001 |
| WO | WO-03071856 | 9/2003 |

OTHER PUBLICATIONS

European Union Office Action dated Sep. 7, 2015.
International Search Report and Written Opinion of the International Searching Authority for corresponding International App. No. PCT/US2010/041591 dated Aug. 31, 2010.
International Search Report and Written Opinion of the International Searching Authority from International PCT App. No. PCT/US2011/066933 dated Apr. 11, 2012.

* cited by examiner

FLUID-BASED ARTICLE DISTRIBUTION AND SORTING SYSTEM

FIELD

The disclosure of the application is directed to article distribution systems and methods of using the same.

BACKGROUND

Various articles or products are often fed into linear distribution systems to transport or move those articles or products to one or more downstream processing stations. Such linear distribution systems, however, have a number of shortcomings. For example, linear distribution systems generally have a series of gates at various locations along the conveyor. However, since these gates are spread out along the length of the conveyor, product can only be fed to one gate at a time. That is, as product is transported down the conveyor, the leading product enters the first open gate that is encountered. This method of sequentially feeding product into gates positioned along a linear conveyor can reduce the efficiency of the available downstream processing stations, while at the same time increasing the required footprint of the distribution system.

Moreover, while product is being directed to a first gate along the conveyor, processing stations downstream of other gates may be shut down or entered into stand-by modes until the first open gates fill up with product. When these packaging stations come back online or re-start, they are more likely to jam or otherwise experience difficulties than those machines that are running more regularly.

In addition, because the upstream gates are always fed with product first the processing stations associated with those gates tend to receive significantly more product than the processing stations associated with gates further down the line. Thus, over time, the packaging stations receive unequal use and wear out at different rates.

SUMMARY

In one embodiment, a radial distribution system for distributing product includes an internal passageway and a plurality of openings radially spaced around the internal passageway. The internal passageway extends from a base portion to an upper portion of the radial distribution system and has an inlet at the base portion to allow product to enter the internal passageway. The plurality of openings are radially spaced around the internal passageway at the upper portion to allow product to exit the internal passageway. A plurality of gate members are associated with at least some of the plurality of openings. The gate members are configured to move between an open position that allows product to move through the opening associated with that gate member and a closed position that restricts product from moving through the opening associated with that gate member.

In some embodiments, a fluid collection area is provided. The fluid collection area at least partially surrounds the internal passageway and is configured to collect fluid that is discharged from the internal passageway. In other embodiments, a plurality of product directing members define distribution flow paths that extend from at least some of the plurality of openings. The product directing members can include a porous portion that extends over the fluid collection area to allow fluid to pass through the product directing members into the fluid collection area. The porous portions of the product directing members can comprise wire cage members. The product directing members can also curve as they extend radially from the openings.

In some embodiments, the internal passageway can have a first cross-sectional area at the inlet and a second cross-sectional area at a location closer to the openings, with the second cross-sectional area being larger than the first cross-sectional area. The internal passageway can also be generally circular in cross-section along its length.

In some embodiments, the gate members can be independently operable between the open and closed positions, irrespective of the position of the other gate members. The gate members can be coupled to the upper portion of the radial distribution system. The gate members can also be configured to allow the passage of fluid through the gate members when the gate members are in the closed position.

In another embodiment, a method of distributing product is provided. The method includes directing fluid and product through an inlet in a lower portion of a radial distribution system and into an internal passageway of the radial distribution system, and directing the fluid and product, through the internal passageway to an upper portion of the internal passageway. The fluid and product can be delivered through a plurality of openings in the upper portion of the internal passageway and onto a plurality of product directing members. At least a portion of the fluid can be separated from the product as the product moves across the product directing members.

In some embodiments, one or more gate members can be provided, with the gate members being associated with the openings. The gate members can be movable between an open position that allows the product to flow through the opening associated with that gate member and a closed position that restricts the flow of product through the opening associated with that gate member. At least one of the gate members can be closed to restrict the flow of product through the opening associated with that gate member. In some embodiments, the internal passageway can have a cross-sectional area that increases from the inlet to the upper portion, and the act of directing the fluid and product through the internal passageway to the upper portion of the internal passageway comprises reducing the velocity of the fluid flowing through the internal passageway as it moves from the inlet to the upper portion.

In some embodiments, the act of separating the portion of the fluid from the product comprises directing the product across a portion of the product directing member that is porous, and allowing fluid to pass through the porous portion of the product directing member into a fluid collection area. In other embodiments, the method includes delivering the product into a product accumulation reservoir that includes the fluid, pumping the fluid and product from the product accumulation reservoir to the radial distribution system, and delivering the fluid from the fluid collection area to the product accumulation reservoir.

In another embodiment, a system for distributing product is provided. The system includes a product accumulation reservoir for receiving product in a fluid, a radial distribution device, a first fluid flow path, and a plurality of product directing members. The device has an inlet in a lower portion of the device and an internal passageway extending from the inlet to an upper portion of the device. The device also has a plurality of radially spaced-apart openings in the upper portion of the device. The first fluid flow path extends between the product accumulation reservoir and the inlet of the radial distribution device. The plurality of product directing members extend radially from the openings in the upper portion of the device.

In some embodiments, the system includes a fluid collection area to receive fluid as it is discharged from the product directing members and a second fluid flow path extending between the fluid collection area and the product accumulation reservoir. In other embodiments, the fluid collection area can at least partially surround the internal passageway of the device. A pump can also be provided and configured to deliver fluid and product from the product accumulation reservoir to the inlet of the device.

In some embodiments, a plurality of gate members can be associated with at least some of the plurality of openings. The gate members can be configured to move between an open position that allows product to move through the opening associated with that gate member and a closed position that restricts product from moving through the opening associated with that gate member.

The foregoing and other objects, features, and advantages of the embodiments disclosed herein will become more apparent from the following detailed description, which proceeds with reference to the accompanying figures.

FIGURES

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Distribution systems, such as those described below, function to move product from one location to another for processing. To increase efficiency, it can be desirable to have a distribution system that is capable of distributing product relatively equally to multiple processing stations. Moreover, since individual processing stations occasionally must be shut down or otherwise rendered temporarily inoperable, it can also be desirable to provide a distribution system that can dynamically respond to such processing needs by redirecting product from one processing station to another. The radial distribution systems described herein can permit product to be simultaneously directed to a plurality of processing stations or conveyors, and, if desired, can be useful to accumulate product and/or redirect product from inactive processing stations.

Figure 1:
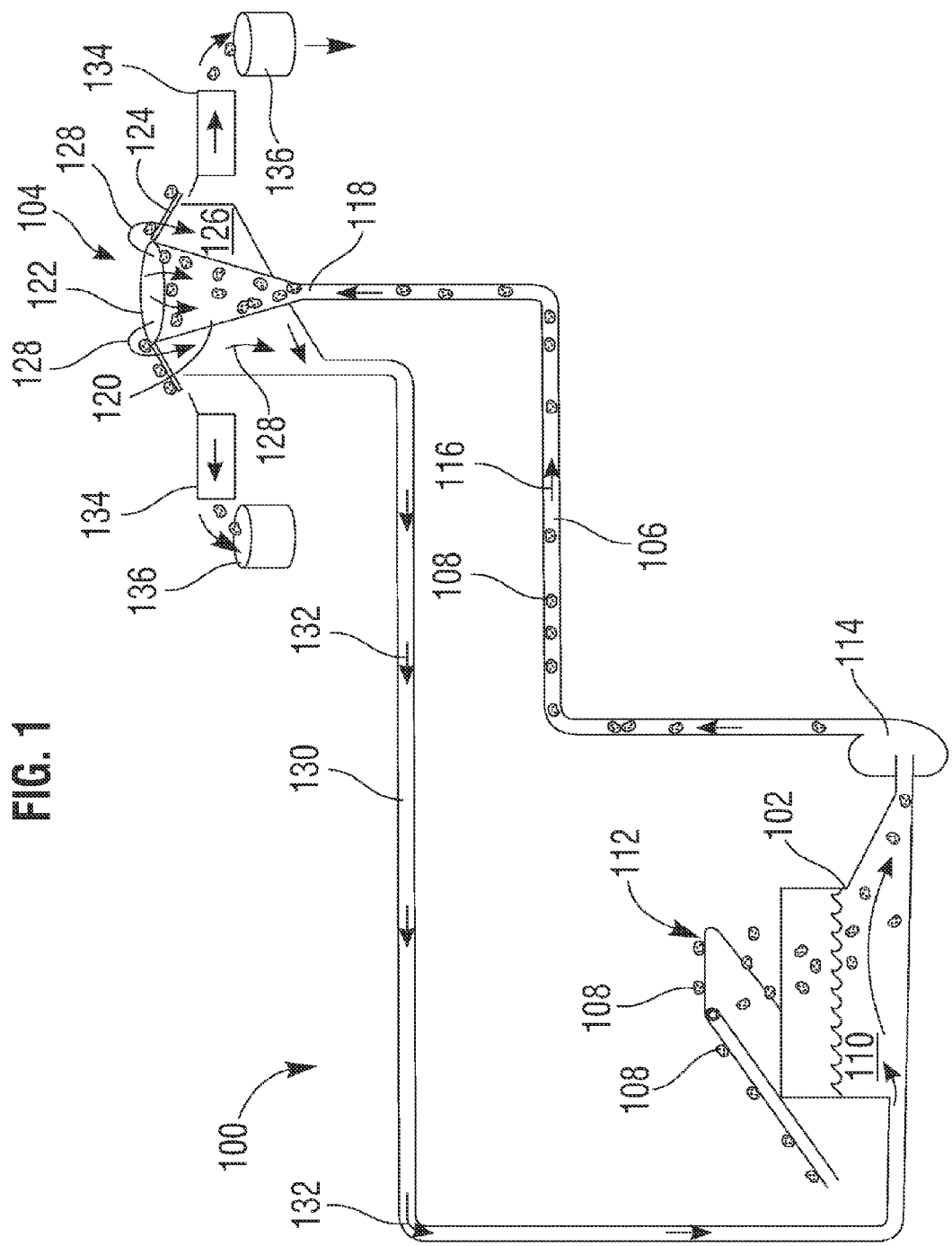
FIG. 1 shows a schematic view of a fluid-based distribution system for distributing product to various downstream processing areas.

FIG. 1 illustrates a fluid-based article sorting and distribution system 100. In some embodiments, the system comprises a product accumulation reservoir 102, a radial distribution system 104, and a fluid delivery path 106 through which product can move from the product accumulation reservoir 102 to the radial distribution system 104. Product accumulation reservoir 102 can comprise a reservoir that contains a volume of fluid 110, such as water, into which product 108 can be delivered. In some embodiments, product 108 comprises whole potatoes or sweet potatoes. However, it should be understood that other food products can be similarly distributed using the fluid-based article sorting and distribution systems disclosed herein.

Initially, product 108 can be delivered into product accumulation reservoir 102. Product 108 can be delivered to product accumulation reservoir 102 in any known manner. Thus, for example, product 108 can be delivered on a conveyor 112 that transports product 108 from a product collection zone (not shown) into product accumulation reservoir 102. As shown in FIG. 1, product 108 can simply be dropped into product accumulation reservoir 102, with the fluid 110 substantially preventing damage from occurring to the product 108 as it falls. Alternatively, other methods can be used to reduce the distance that product 108 falls from a product feed zone (e.g., conveyor 102). For example, slides or chutes or other such delivery mechanisms can be utilized to reduce the speed of the product 108 entering the product accumulation reservoir 102.

Product accumulation reservoir 102 can be sufficiently large to collect and store a desired amount of product 108 therein. As product 108 accumulates in product accumulation reservoir 102, some of the product 108 can be drawn out of the product accumulation reservoir 102 and into the fluid delivery path 106. Fluid delivery path 106 can comprise a pipe or other conduit that has a sufficiently large cross-sectional area so that fluid 110 can move the product 108 across fluid delivery path 106. Thus, for example, larger diameter product may require larger diameter piping. A pump 114 can be provided to pump fluid 110, along with product 108 in the fluid 110, from the product accumulation reservoir 102. As product 108 is pumped into the fluid delivery path 106, it moves in the direction of arrow 116 towards the radial distribution system 104.

Radial distribution system 104 comprises an opening (inlet) 118 in fluid communication with fluid delivery path 106. An internal passageway 120 extends from opening 118 into the radial distribution system 104. As the fluid 110 flows into opening 118 and up the internal passageway 120, product 108 is similarly directed into opening 118 and up the internal passageway 120. One or more openings 122 in the internal passageway 120 allow product 108 to exit the internal passageway 120 and flow into a plurality of distribution flow paths 124.

The fluid 110 is also pumped through internal passageway 120 and out of the openings 122. As the fluid 110 exits the openings 122, it flows into a fluid collection area 126 as shown by arrows 128. From the fluid collection area 126, the fluid 110 is returned to the product accumulation reservoir 102 via a return fluid delivery path 130 in the direction shown by arrows 132. Accordingly, the fluid 110 in the fluid-based article sorting and distribution system 100 operates as a closed-loop delivery system that delivers product 108 from the product accumulation reservoir 102 to the radial distribution system 104 and then is recycled for use again in delivering additional product from the product accumulation reservoir 102 to the radial distribution system 104.

Product 108 exiting the internal passageway flow into a plurality of distribution flow paths 124. These distribution flow paths 124 direct product 108 in a predetermined direction for additional processing. For example, as shown in FIG. 1, product 108 can be directed to one or more additional transport devices 134, such as a twin screw feeder, and then cut into any desired shape by cutting machines 136. Product 108 that has been directed down a distribution flow path 124 and cut by a cutting machine 136 can then be bagged and/or subjected to further processing.

Referring again to FIG. 1, to the extent that the fluid delivery path 106 has any bends or curves between the product accumulation reservoir 102 and the radial distribution system 104, the fluid delivery path 106 is preferably relatively straight in the vicinity of opening 118. By providing a relatively straight section of fluid delivery path 106 prior to directing fluid 110 (and product 108) through opening 118, turbulence in the flow of fluid 110 can be reduced, providing more efficient and consistent delivery of product into the radial distribution system 104. In some embodiments, the fluid delivery path 106 comprises a relatively straight section that extends at least twice the radius of the fluid delivery path 106 in length from the opening 118 of the radial distribution system 104.

Although FIG. 1 illustrates a system that utilizes a pump to direct fluid and product carried by the fluid into a radial distribution system. However, it should be understood that other systems and methods can be used to direct fluid to a radial distribution system. For example, instead of a pump, fluid can be directed to a radial distribution system using a gravity-powered fluming system that is capable of providing a requisite amount of fluid (e.g., water) flow to the radial distribution system to distribute product as described herein.

Figure 2:
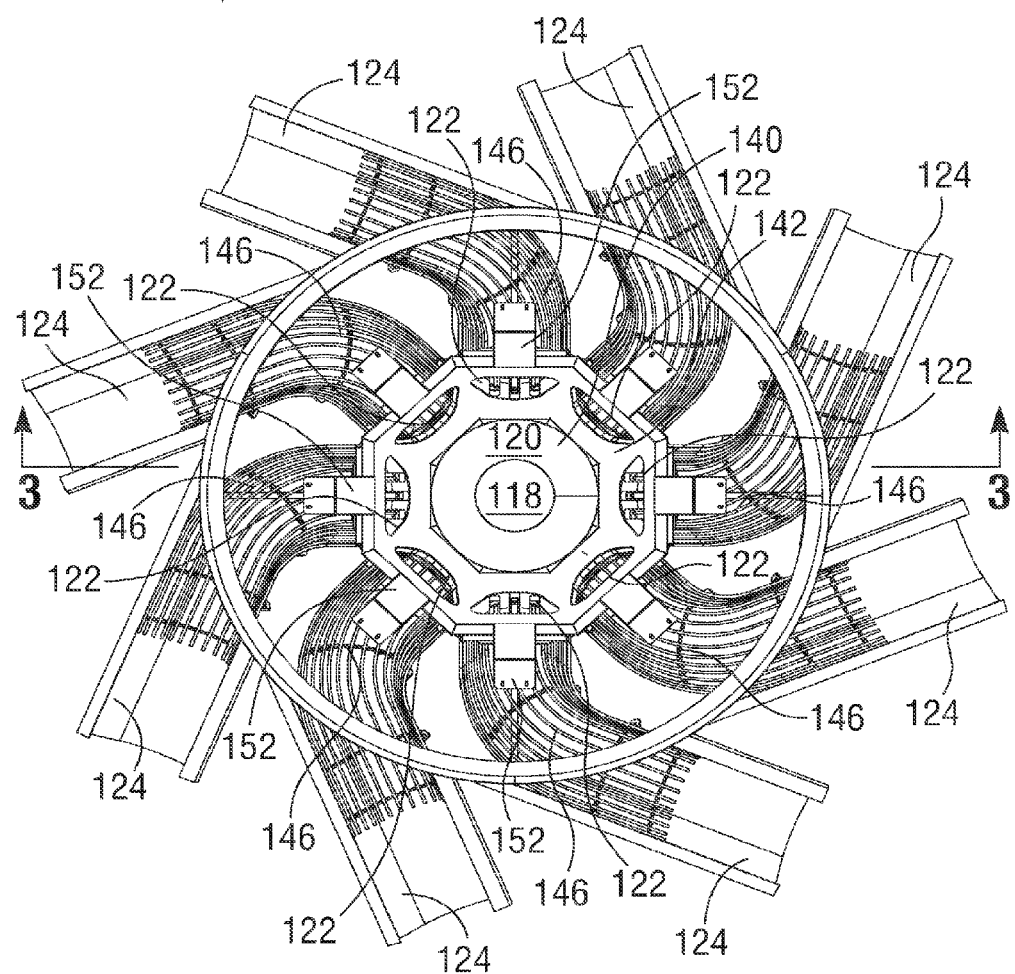
FIG. 2 shows a top view of a fluid-based distribution system.
Figure 3:
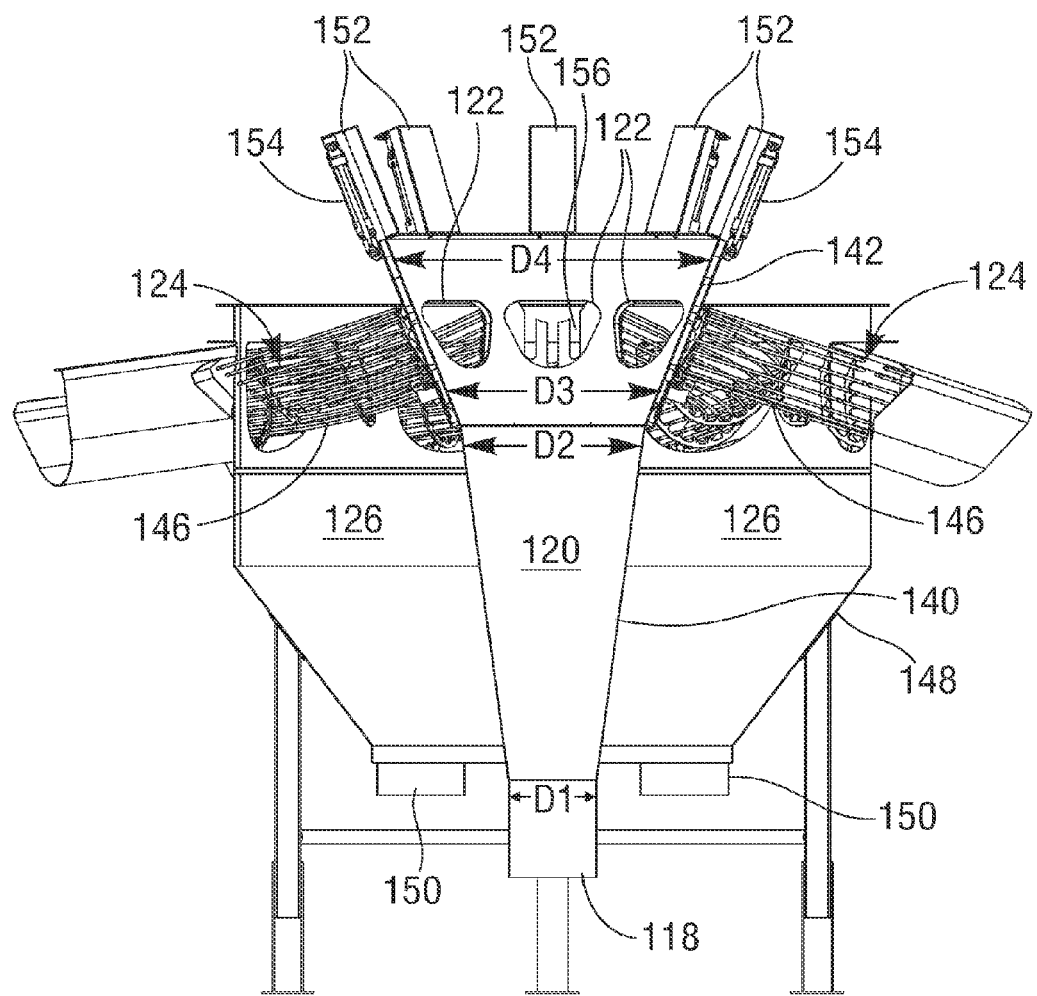
FIG. 3 shows a cross-sectional view of the fluid-based distribution system shown in FIG. 2, taken along line 3-3 of FIG. 2.

FIGS. 2-5 illustrate various views of an embodiment of a radial distribution system 104. FIG. 2 illustrates a top view of the radial distribution system 104 and FIG. 3 illustrates a cross-sectional view of the radial distribution system 104 taken along line 3-3 of FIG. 2. As seen in FIGS. 2 and 3, internal passageway 120 is defined by a lower wall portion 140 and an upper wall portion 142. Lower and upper wall portions 140, 142 collectively define the internal passageway. The terms lower and upper refer to relative positions, not to the lowest or uppermost portions of the system. That is, any portion that is above a "lower" portion can be considered an "upper" portion and any portion that is below an "upper" portion can be considered a "lower" portion.

As best seen in FIG. 3, lower wall portion 140 comprises a generally cylindrical portion that includes opening 118. The diameter (or width) of the generally cylindrical portion is indicated in FIG. 3 is D1. Lower wall portion increases in diameter (or width) from D1 to D2 as it extends upwards. Similarly, upper wall portion 142 increases in diameter (or width) as it extends upwards. Thus, upper wall portion 142 increases in diameter from diameter D2 to diameter D3 in the vicinity of the plurality of openings 122. In addition, upper wall portion further increases in diameter from diameter D3 in the vicinity of openings 122 to diameter D4 above openings 122. As shown in FIG. 3, D1<D2<D3<D4.

The increase in diameter from opening 118 to openings 122 reduces the speed that product 108 moves through the internal passageway 120 of radial distribution system 104 by decreasing fluid flow through those areas. Preferably, fluid delivery path 106 is configured with a diameter only slightly larger than a maximum diameter of the product being distributed therein. This configuration allows fluid 110 to flow through fluid delivery path 106 at a relatively high velocity. High flow velocities can help reduce the occurrence of plugging of product 108 within fluid delivery path 106. However, the velocity within the internal passageway 120 is desirably lower than the velocity within fluid delivery path 106. The flaring of the internal passageway 120, in the manner shown in FIG. 3, functions as a vertical de-accelerator that reduces the velocity of fluid 110 (and, therefore, product 108) as it moves through internal passageway 120 to openings 122.

Referring again to FIG. 2, a plurality of openings 122 are provided in upper wall portion 142. Each opening 122 can lead to a distribution flow path 124 defined by product directing members (e.g., wire cage members and/or other surfaces that can direct the movement of product from the openings). FIG. 2 illustrates eight openings 122 that lead to eight distribution flow paths 124. However, it should be understood that different numbers of openings and distribution flow paths are possible. Thus, for example, radial distribution system 104 can have as few as three distribution flow paths or as many as sixteen distribution flow paths. In some embodiments, it may be possible to have more than sixteen distribution flows paths; however, depending on the product that is being distributed, the diameter D3 in the vicinity of the openings 122 will likely have to increase significantly to support such a large number of distribution flow paths.

Each distribution flow path 124 can include a fluid reduction portion (e.g., a de-watering portion) 146. Fluid reduction portions 146 are configured so that fluid (e.g., water) that exits through the openings 122 with product 108 can be removed from the distribution flow path 124. In this manner, the fluid 110 can separated from the product 108 and, if desired, directed back to the product accumulation reservoir 102 for reuse. As best seen in FIG. 3, fluid reduction portions 146 comprise pathways that have porous areas to allow fluid 110 to pass through the fluid reduction portions 146. Such porous pathways can comprise, for example, wire cage members that have sufficient structure to prevent product 108 from passing through the porous areas, while allowing fluid 110 to flow downward into a fluid collection area 126. Fluid collection area 126 can generally surround lower and upper wall portions 140, 142. Thus, fluid collection area 126 can be defined by the space between an external wall surface of lower and upper wall portions 140, 142 and an inside surface of an external wall member 148. One or more outlets 150 can be provided to direct fluid 110 from the fluid collection area 126 back to the product accumulation reservoir 102.

Distribution flow paths 124 outside of the fluid reduction portions 146 can be also comprise porous pathways; however, since a majority of fluid 110 has been removed from the distribution flow paths 124 in the fluid reduction portions 146, the distribution flow paths 124 outside of the fluid reduction portions 146 can be formed without any such porous areas.

Figure 4:
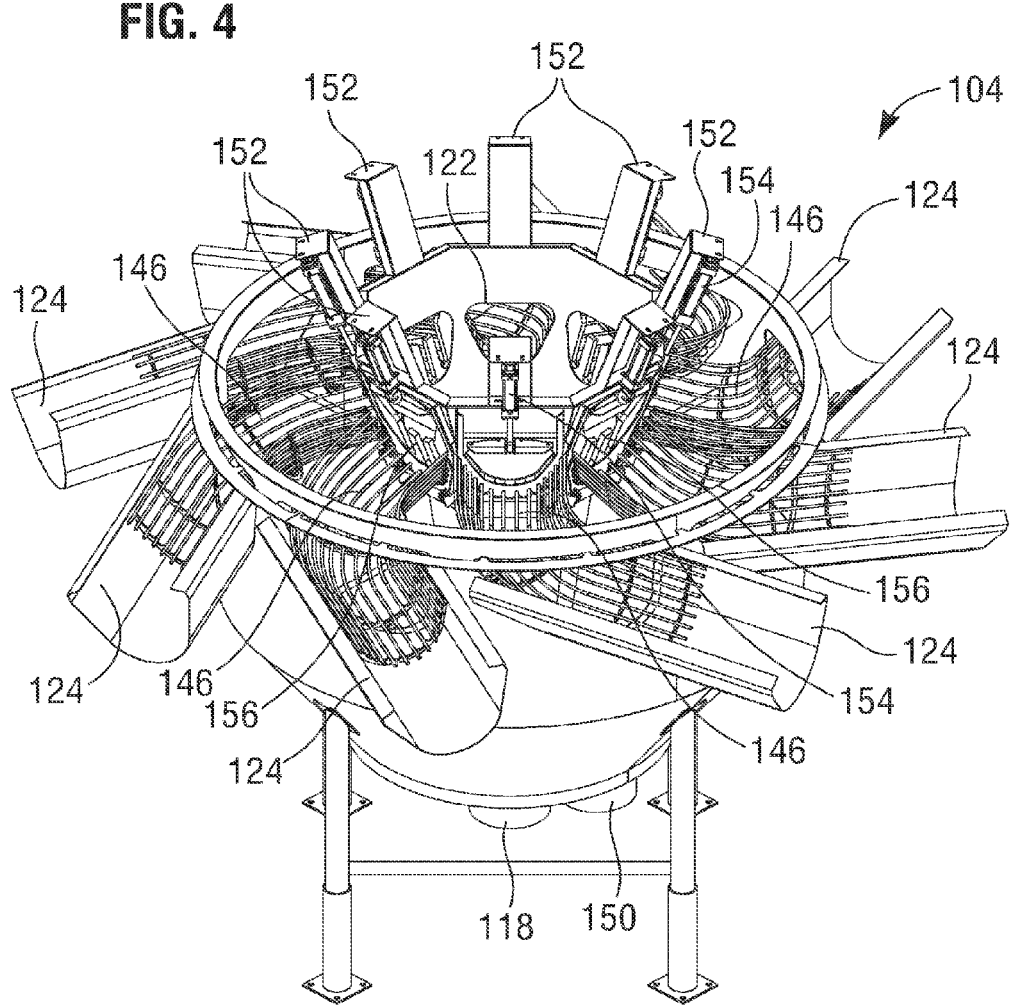
FIG. 4 shows a perspective view of the fluid-based distribution system shown in FIG. 2.

As shown in FIGS. 2 and 4 distribution flow paths 124 can curve or sweep as they extend from openings 122. The curvature of the distribution flow paths 124 can be useful for certain product, such as whole potatoes. Whole potatoes (regular or sweet) may roll when exiting openings 122 and entering a distribution flow path 124. Such rolling motion can be undesirable because rolling potatoes tend to move in a somewhat erratic manner. By curving a distribution flow path 124 in the manner shown in FIGS. 2 and 4, whole potatoes are more likely to slide across the distribution flow paths 124 in a controlled manner.

A plurality of radially-spaced gate members 152 can be positioned adjacent the openings 122, with each gate member 152 positioned adjacent one opening 122. Each gate member 152 can be configured to be operable to move between an open position and a closed position. In an open position, a gate member 152 allows product 108 to pass through the opening 122 associated with that game member 152. In the closed position, the gate member 152 restricts product 108 from passing through the opening 122 associated with that gate member 152.

Figure 5:
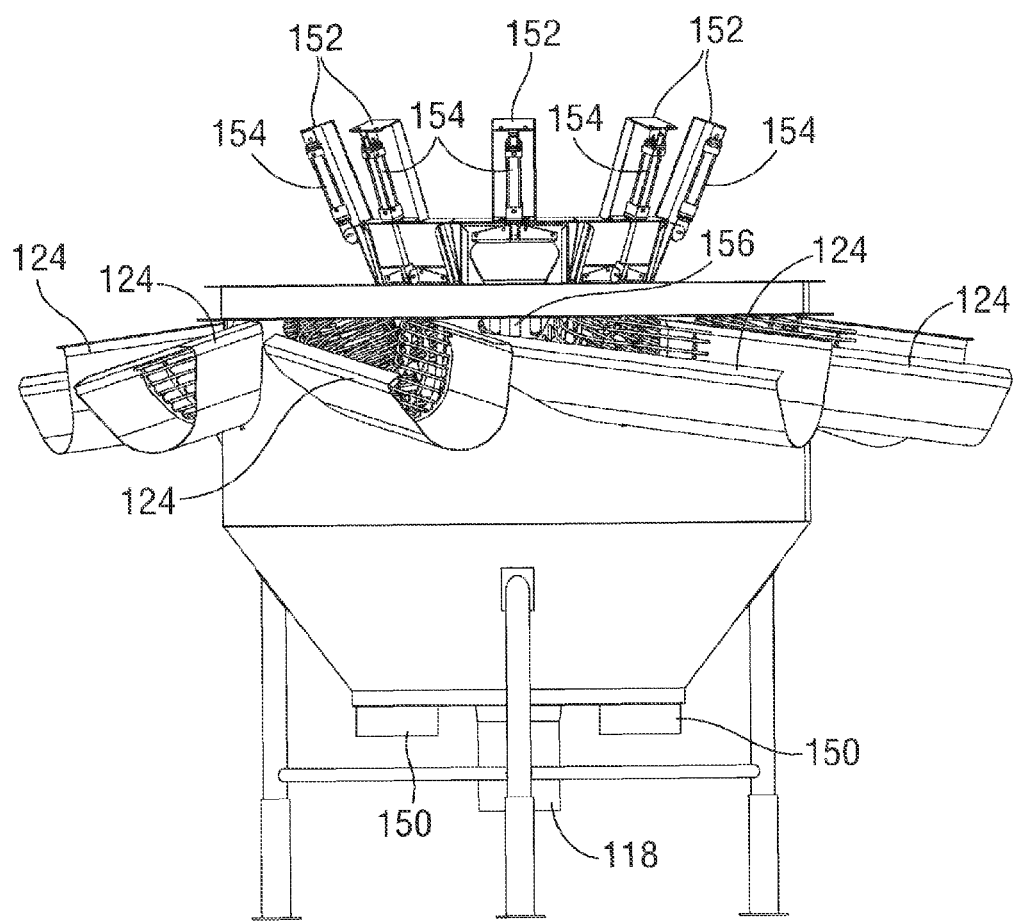
FIG. 5 shows a side view of the fluid-based distribution system shown in FIG. 2.

Various configurations for opening and closing gate members 152 can be used. For example, as best shown in FIG. 5, each gate member 152 can be mounted and/or coupled to a gate air cylinder 154, which is configured to move gate member 152 upward and downward between the open and closed positions. Alternatively, gate member 152 can be slid open in another direction (e.g., sideways) and/or configured to move between an open and closed position in other ways, such as by pivoting about a hinge member. Because the gate members can be opened and closed independently, at any given time one or more gate members can be in an open position while other gate members are in a closed position. In addition, it may be desirable to allow a gate member to be operable in a partially opened position.

Referring to FIG. 3, the cross-sectional view of the radial distribution system 104 illustrates two gates in an open position and one gate in a closed position. Gate member 152 can comprise an opening-restricting portion 156. Opening-restricting portion 156 can be a porous member, such as the finger-like structure shown in FIG. 3. Thus, when the gate member 152 is in the closed position, fluid 110 can still be allowed to pass through the "closed" gate member 152. To move the gate member 152 into the open position, opening-restricting portion 156 can be moved out of the opening 122. In some embodiments, this can comprise moving the opening-restricting portion 156 upward and away from opening 122. In other embodiments, the opening-restricting portion 156 can move downward causing an opening-permitting portion of the gate member 152 to align with the opening 122, thereby allowing product 108 to pass through opening 122 and enter a distribution flow path 124.

Figure 6:
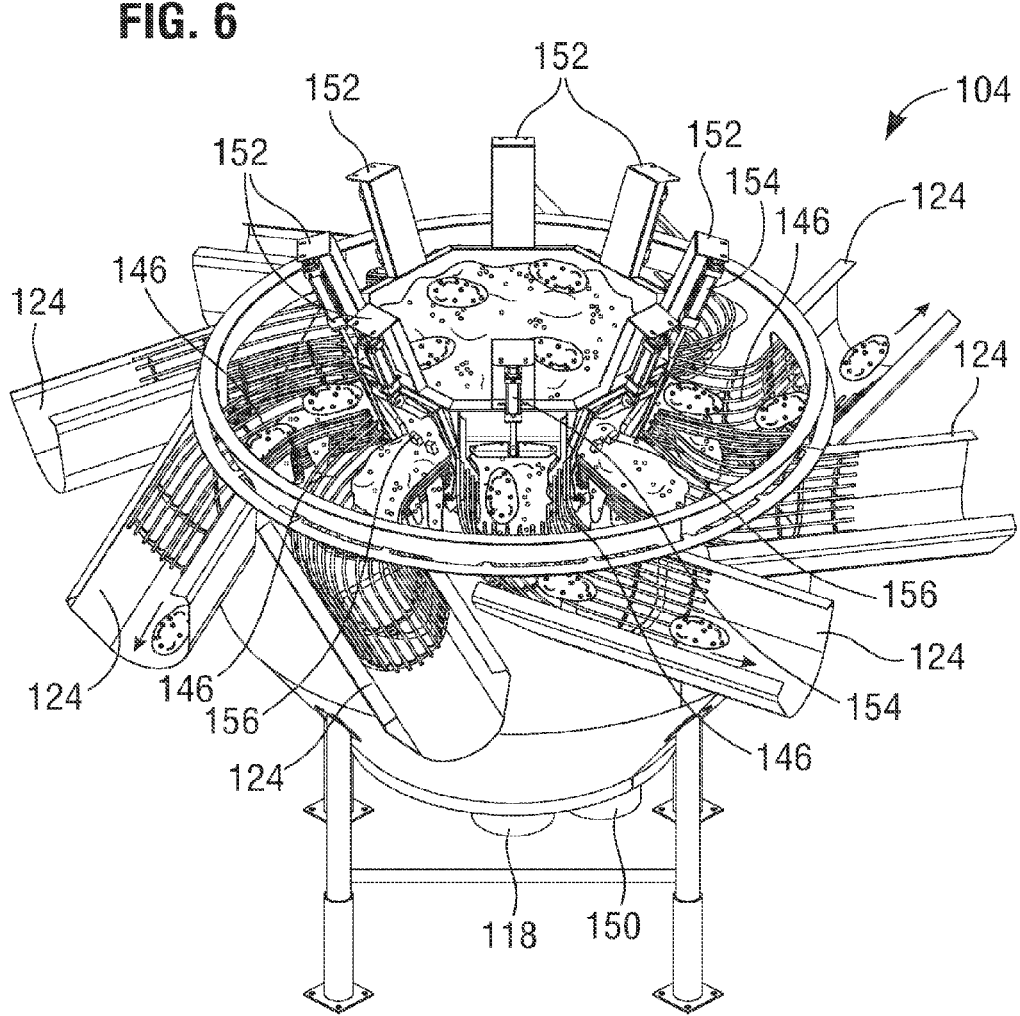
FIG. 6 shows the fluid-based distribution system of FIG. 4 with exemplary fluid and product being distributed therein.

FIG. 6 illustrates radial distribution system 104 in operation. For convenience, other elements of the system (such as the fluid feeding tubes or downstream processing stations) are omitted. As seen in FIG. 6, product (e.g., potatoes) can be carried upward towards the top of radial distribution system 104 by the fluid (e.g., water) until the product encounters an open gate member 152. As the product passes through gate member 152, the product is de-watered as it passes through and/or over fluid reduction portions 146. The de-watered product then is directed along the respective distribution flow paths 124.

The substantially random nature of the flow of product 108 through the internal passageway 120 of the radial distribution system 104 helps to keep product generally evenly distributed to the various' openings 122. If any gate members 152 are closed, product 108 will circulate within the radial distribution system 104 until it encounters a gate member 152 that is in an open position. Once product 108 reaches that open gate member 152, it can exit the opening 122 and move onto the associated distribution flow path 124.

As noted above, each of the gate members 152 can be separately (individually) opened and closed. Accordingly, if there is a problem with one of the downstream processing stations, the corresponding gate member that controls product flow to that processing station can be closed to prevent additional product 108 from being directed to that station.

Figure 7:
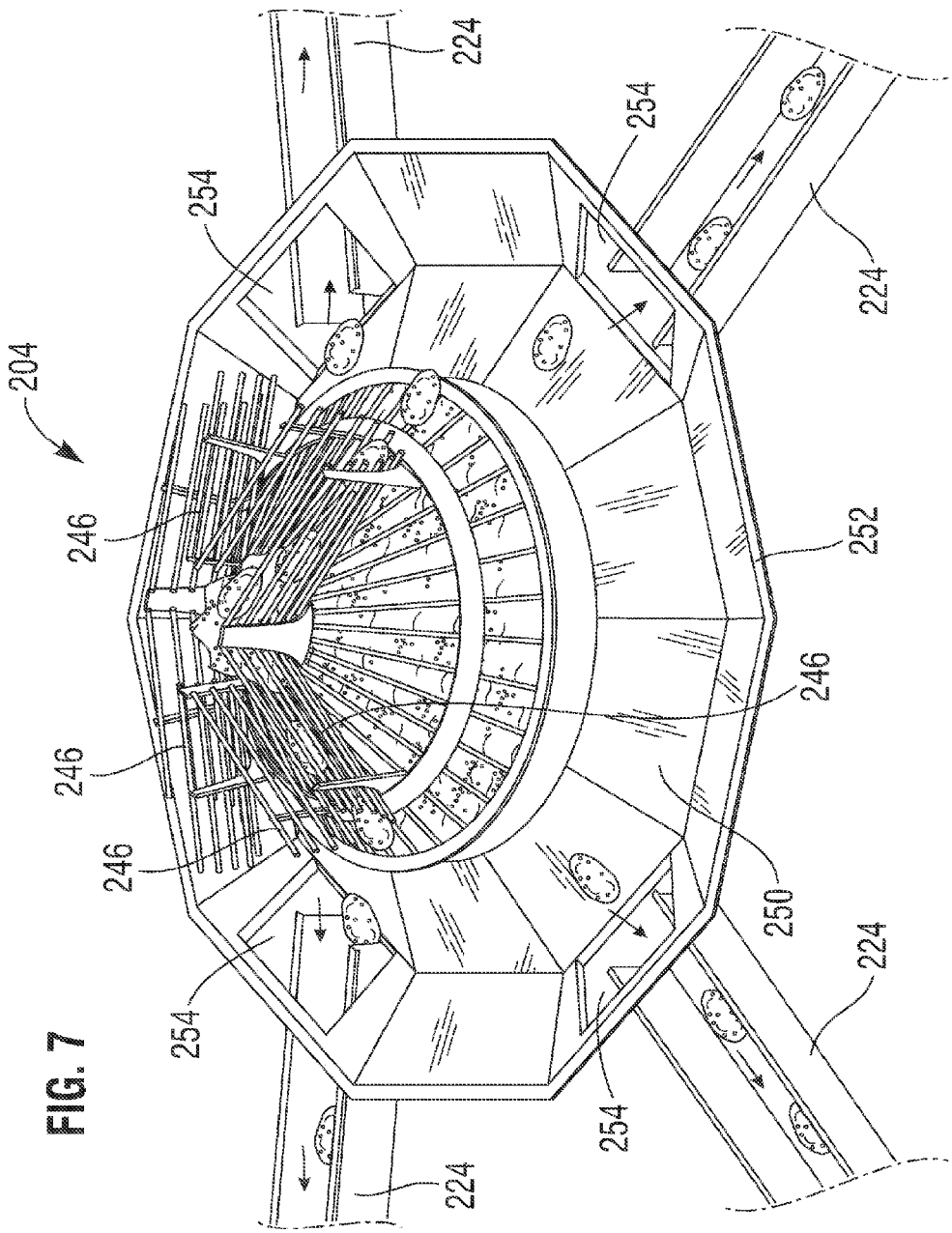
FIG. 7 shows a perspective view of another embodiment of a fluid-based distribution system.

FIG. 7 illustrates another embodiment of a radial distribution system 204. As in other systems describe herein, radial distribution system 204 comprises an opening (inlet) through which fluid and product can be received and an internal passageway extending from the opening into radial distribution system 204. As fluid (e.g., water) flows into the opening and up the internal passageway, product can be directed along one or more fluid reduction portions 246 or dewatering paths.

After leaving fluid reduction portions 246, product is delivered to a base member 250. In some embodiments, base member 250 substantially surrounds fluid reduction portions 246. Base member 250 can be configured to retain product if necessary. For example, base member 250 can be surrounded by one or more walls 252 that allow for the retention of product within base member 250.

Product can be directed from fluid reduction portions 246 onto base member 250. In some embodiments, product can be directed directly from fluid reduction portions 246 into a plurality of distribution flow paths 224. Distribution flow paths 224 can be coupled to base member 250 or otherwise positioned adjacent to base member 250. Openings 254 can be provided in wall(s) 252 to allow product to pass from base member 250 to distribution flow paths 224. Gate members (not shown) can be provided adjacent openings 254 to control the flow of product through openings 254. Gate members can be formed as described above or in other manners to restrict product from passing through a respective opening 254 in one configuration (a closed configuration) and allow product to pass through the respective opening 254 in another configuration (an open configuration).

The gate members can be independently controlled in the same manner as other gate members described herein. By closing gate members, the distribution of product down the respective distribution flow path 224 can be interrupted or halted, causing product to accumulate on base member 250. To direct product accumulated on base member 250 to an open gate member, base member 250 can be coupled to a vibratory mechanism or other such structure capable of moving product radially along base member 250. In other embodiments, product can be moved radially from a closed opening 254 to another opening 254 by directing fluid radially along base member 250.

In certain embodiments, one or more gate members can be partially opened in order to adjust the size of the product that is permitted to pass through that gate member. A so-called "partially opened" gate member can also include a gate member that is configured with one or more openings in the gate member to allow product to pass through the gate member when it is in an otherwise "closed" position. Thus, instead of being a gate member that is movable to a certain position to expose a gate opening, such a gate member could have one or more openings in the gate member itself. Such openings could be used to grade or otherwise sort product. For example, the openings could be sized to allow only product having certain characteristics to pass through the openings. Thus, for example, such gate members could be used to "weed-out" smaller-dimensioned whole potatoes from a sorting processing that involved the distribution of larger-sized whole potatoes.

It should be noted that the dimensional specifications can vary depending on the product that is distributed. In fact, the optimal dimensional specifications of the device can vary significantly for a single product type (e.g., whole sweet potatoes) in view of natural variation of potatoes and commercial preferences for different sizes and cuts of sweet potatoes.

Product that is to be distributed in accordance with the radial distribution systems described herein can be processed in various manners before reaching the distribution system 100. For example, pre-distribution processing can take place upstream of conveyor 112. Such upstream processing station can include, for example, food processing stations such as cutting and/or heating. After leaving the upstream processing station, product can be delivered to the product accumulation reservoir 102 for delivery to the radial distribution system for distribution to one or more downstream processing stations. These further processing stations could include, for example, in the case of potatoes, cutting machines, frying machines, freezer machines, and/or packaging machines.

In conventional linear distribution systems (so-called "run-around" systems), product that reaches the end of the linear conveyor without entering into an open gate is then dropped onto several linear conveyors to change the conveying direction of the product and return the product to the beginning of the linear conveyor. In contrast, when product is fed into the fluid-based radial distribution systems described herein, product accumulates in the internal passageway 120 of the radial distribution system 104 until it leaves via an open gate member. Thus, the radial distribution systems described herein do not require complex and lengthy run-around systems to re-cycle product for distribution. Product can be intentionally accumulated for a limited period of time (a few minutes for example depending on the rate of product flow and size of the base member) by closing all the gates or quasi-accumulated by closing enough gates such that the rate of product in flow exceeds the rate of product out flow. This has several benefits. The radial distribution systems described herein eliminate the multiple drop points that "run-around" systems require to re-cycle product Minimizing the number of drop points reduces damage to product during distribution. Also, radial distribution system can be more easily cleaned using "clean-in-place" (CIP) technology since it is a relatively compact system.

In addition, by using fluid (e.g., water) as the distribution medium, the transfer of product from one location can be "cushioned" by the fluid. Thus, for example, as the product is delivered into the internal passageway and out of the openings, the fluid can soften the effect of changes in height. In this manner, the negative effects associated with conventional systems that require, for example, "dropping" product from one conveyor to another, can be eliminated and/or greatly reduced.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for distributing product, the system comprising:
    a product accumulation reservoir configured and operable to hold a fluid to receive product;
    a radial distribution device having an inlet in a lower portion of the device and an internal passageway extending from the inlet to an upper portion of the device, the device having a plurality of circumferentially spaced-apart openings in the upper portion of the device;
    a first fluid flow path extending between the product accumulation reservoir and the inlet of the radial distribution device; and
    a plurality of product directing members extending radially from the openings in the upper portion of the device;
    a second fluid flow path extending between the radial distribution device and the product accumulation reservoir.

2. The system of claim 1, further comprising:
    a fluid collection area to receive fluid as it is discharged from the product directing members.

3. The system of claim 2, wherein the fluid collection area at least partially surrounds the internal passageway of the device.

4. The system of claim 1, further comprising a pump configured to deliver fluid and product from the product accumulation reservoir to the inlet of the device.

5. The system of claim 1, further comprising a plurality of gate members associated with at least some of the plurality of openings, with the gate members being configured to move between an open position that allows product to move through the opening associated with that gate member and a closed position that restricts product from moving through the opening associated with that gate member.

* * * * *